US010287739B2

(12) United States Patent
Kida et al.

(10) Patent No.: US 10,287,739 B2
(45) Date of Patent: May 14, 2019

(54) DISASTER PREVENTION SYSTEM

(71) Applicant: KABUSHIKI KAISHA TOSHIBA, Minato-ku (JP)

(72) Inventors: Satoshi Kida, Tokyo (JP); Masakazu Wada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 113 days.

(21) Appl. No.: 15/426,551

(22) Filed: Feb. 7, 2017

(65) Prior Publication Data
US 2017/0145648 A1    May 25, 2017

Related U.S. Application Data

(63) Continuation of application No. PCT/JP2016/051435, filed on Jan. 19, 2016.

(30) Foreign Application Priority Data

Apr. 6, 2015  (JP) ................. 2015-077954

(51) Int. Cl.
*E02B 3/10* (2006.01)
*G08B 31/00* (2006.01)
(Continued)

(52) U.S. Cl.
CPC ............. *E02B 3/104* (2013.01); *E02B 3/10* (2013.01); *E02B 7/20* (2013.01); *G01C 21/3407* (2013.01);
(Continued)

(58) Field of Classification Search
CPC ....... E02B 3/10; E02B 3/104; G01C 21/3407; G08B 27/005
(Continued)

(56) References Cited

U.S. PATENT DOCUMENTS 4,478,534 A    10/1984 McIlwain
6,947,842 B2 *  9/2005 Smith .................... G01W 1/10
                                                    702/3
(Continued)

FOREIGN PATENT DOCUMENTS

CN        101477206 A     7/2009
CN        201660870 U    12/2010
(Continued)

OTHER PUBLICATIONS

International Search Report (with Written Opinion) dated Apr. 5, 2016 in PCT/JP2016/051435 filed Jan. 19, 2016 (with English translation).

(Continued)

*Primary Examiner* — Thomas G Black
*Assistant Examiner* — Luat T Huynh
(74) *Attorney, Agent, or Firm* — Oblon, McClelland, Maier & Neustadt, L.L.P.

(57) ABSTRACT

This invention provides a disaster prevention system capable of taking an effective measure against a flood disaster. According to one embodiment, a disaster prevention system comprises a weather prediction unit configured to calculate a predicted rainfall in a region based on rainfall information necessary for protecting the region from a flood; an analysis unit configured to determine, based on the predicted rainfall calculated by the weather prediction unit, whether a flood can occur in the region; and a control unit configured to control to close a water stop gate provided in the region to protect the region from the flood if the analysis unit determines that the flood can occur in the region.

20 Claims, 7 Drawing Sheets

(51) Int. Cl.
*G01C 21/34* (2006.01)
*G08B 27/00* (2006.01)
*E02B 7/20* (2006.01)
*E02B 3/00* (2006.01)
*G01C 21/20* (2006.01)
*G08B 7/06* (2006.01)

(52) U.S. Cl.
CPC ............ *G08B 27/005* (2013.01); *G08B 31/00* (2013.01); *E02B 3/00* (2013.01); *G01C 21/20* (2013.01); *G08B 7/066* (2013.01); *Y02A 10/42* (2018.01)

(58) Field of Classification Search
USPC ....................................................... 701/2, 423
See application file for complete search history.

(56) References Cited

U.S. PATENT DOCUMENTS 8,423,290 B1 * 4/2013 Walsh .................... G01C 21/34
340/995.19

2011/0110722 A1   5/2011   Van Den Noort
2013/0020561 A1   1/2013   Suzuki et al.

FOREIGN PATENT DOCUMENTS

| JP | 10-141203 A | 5/1998 |
| JP | 2002-298063 | 10/2002 |
| JP | 2002298063 A * | 10/2002 |
| JP | 2003-82956 | 3/2003 |
| JP | 2004-192206 | 7/2004 |
| JP | 2004-197554 | 7/2004 |
| JP | 2005-200972 A | 7/2005 |
| JP | 2010-134663 | 6/2010 |
| JP | 2011-521126 | 7/2011 |
| JP | 2012-58184 A | 3/2012 |
| JP | 3175722 U | 5/2012 |
| JP | 2013-100341 | 5/2013 |

OTHER PUBLICATIONS

Written Opinion dated Apr. 5, 2016 in PCT/JP2016/051435 filed Jan. 19, 2016.

* cited by examiner

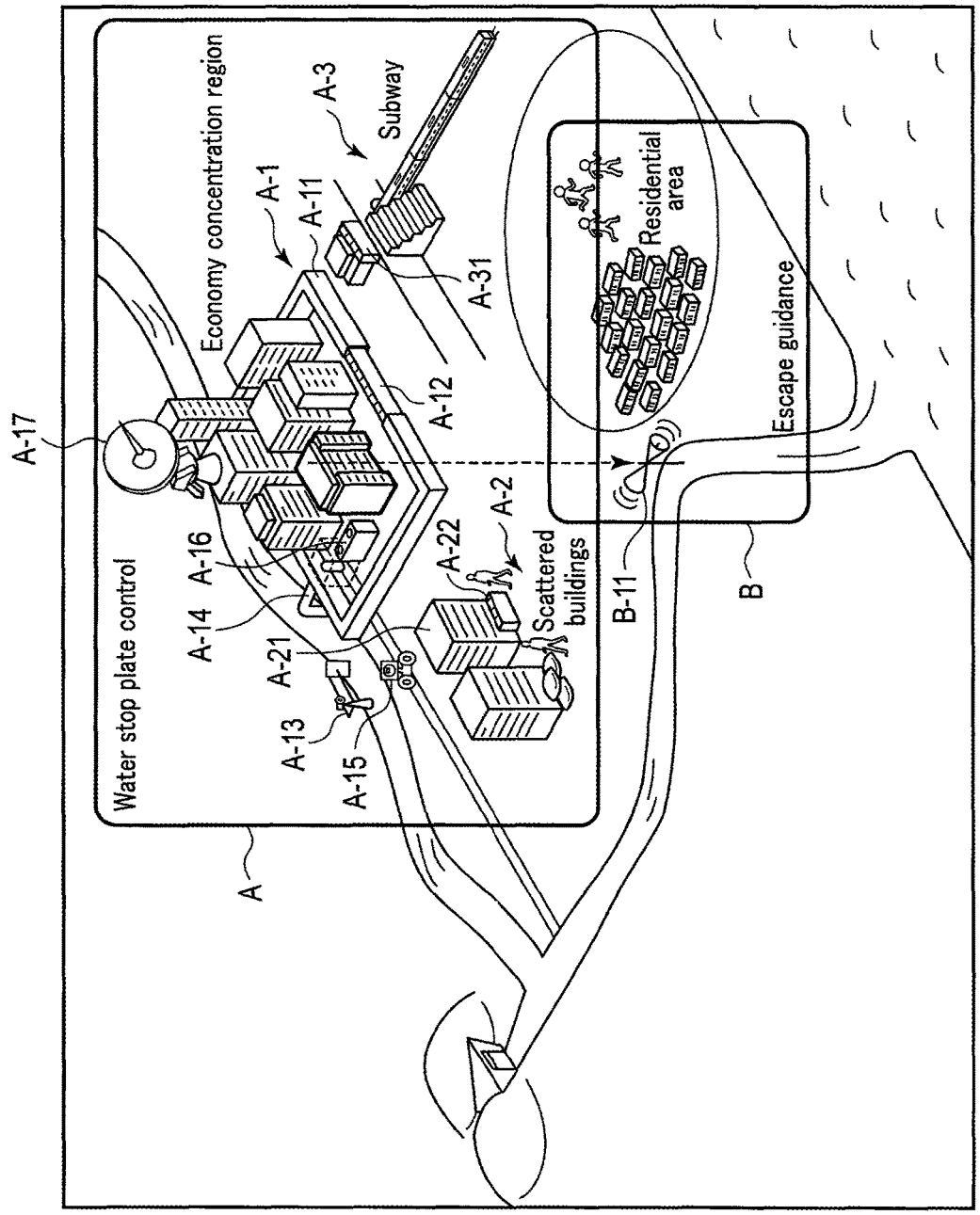
F I G. 1

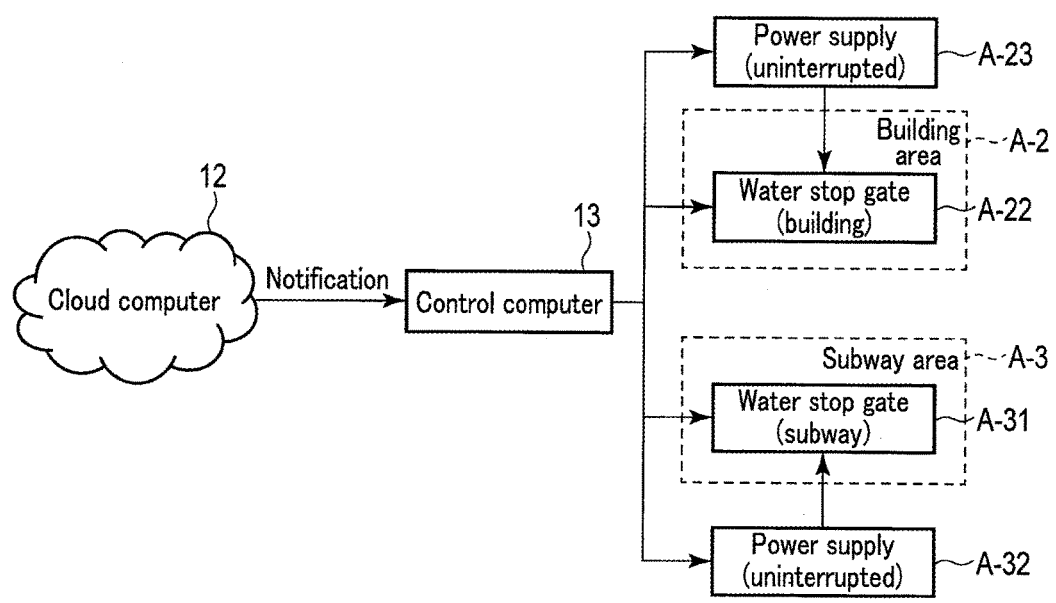
F I G. 6

| | Elementary school | A | | Region with flood depth of 200 cm or more |
| | Public hall | B | | Region with flood depth of 100 to 200 cm |
| | Senior high school | C | | Region with flood depth of 50 to 100 cm |
| | Park | D | | Region with flood depth less than 50 cm |
| | Evacuation space | | | |

DISASTER PREVENTION SYSTEM

CROSS-REFERENCE TO RELATED APPLICATIONS

This application is a Continuation Application of PCT Application No. PCT/JP2016/051435, filed Jan. 19, 2016, and based upon and claiming the benefit of Japanese Patent Application No. 2015-077954, filed Apr. 6, 2015 the entire contents of which are incorporated herein by reference.

FIELD

Embodiments described herein relate generally to a disaster prevention system capable of coping with the risk of a flood disaster such as an overflow or a flood.

BACKGROUND

In developed countries, recently, damage of a flood disaster such as an overflow or a flood is decreasing as the construction of infrastructures progresses. In developing countries, however, the construction of infrastructures is insufficient, and flood disasters readily occur, as compared to the developed countries.

Especially in a district of a developing country where economic activities concentrate as in a developed country, the risk of human damage and economic damage caused by a flood disaster is high, and there is an adverse effect on the economic growth.

On the other hand, there is known a technology of forecasting a flood using water-associated information in a place where a river may overflow and metrological information from the Meteorological Agency to protect a region from a flood disaster such as an overflow or a flood.

In a developed country, since the infrastructures are constructed, as described above, it is possible to easily collect water level information of a river and the like and relatively correctly predict a flood. However, in a developing country, it is not easy to collect various kinds of information, and it is impossible to correctly predict a flood.

Hence, particularly in a developing country, since the infrastructures are not constructed, it is difficult to correctly predict a flood. For this reason, the environment readily suffers human damage and economic damage, and a disaster prevention system capable of taking an effective measure against a flood disaster has been demanded.

BRIEF DESCRIPTION OF THE DRAWINGS

FIG. 1 is a view showing the overview of a disaster prevention system according to the embodiment;

FIG. 6 is a block diagram showing a disaster prevention system according to the second embodiment, which is configured to control in a building area A-2 and a subway area A-3;

DETAILED DESCRIPTION

Figure 2:
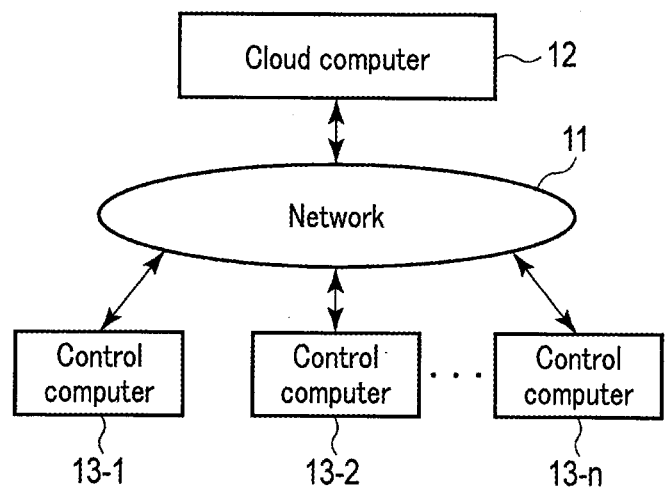
FIG. 2 is a block diagram showing the relationship between control computers 13-1 to 13-*n* and a cloud computer 12.

In general, according to one embodiment, a disaster prevention system comprises a weather prediction unit configured to calculate a predicted rainfall in a region based on rainfall information necessary for protecting the region from a flood; an analysis unit configured to determine, based on the predicted rainfall calculated by the weather prediction unit, whether a flood can occur in the region; and a control unit configured to control to close a water stop gate provided in the region to protect the region from the flood if the analysis unit determines that the flood can occur in the region.

An embodiment will now be described with reference to the accompanying drawings.

FIG. 1 is a view showing the overview of a disaster prevention system according to the embodiment.

As described above, in a developing country, if a region (to be referred to as an economy concentration region hereinafter) where economic activities concentrate is hit by a flood disaster, the damage is large and adversely affects the economic growth. In this embodiment, a disaster prevention method in an economy concentration region A and a disaster prevention method in a residence region B other than the economy concentration region A will be described.

As shown in FIG. 1, an economy concentration area A-1 where important facilities such as buildings and schools concentrate in the economy concentration region A is surrounded by a high wall A-11 to prevent the economy concentration area A-1 from being flooded. A water stop gate A-12 configured to protect the economy concentration area A-1 from a flood is provided at the gateway.

Note that although a case in which the outside of the economy concentration area A-1 is surrounded by the high wall A-11 has been described here, the present invention is not limited to this. For example, not only the outside but also the inside of the economy concentration area A-1 may be subdivided by the wall A-11, and the water stop gate A-12 may be provided for each of the subdivided areas. The water stop gate A-12 arranged for each subdivided area may be controlled in accordance with the flood state of the subdivided area.

Examples of the economy concentration area A-1 are concentration areas of a block of office buildings, a government district, a business district, an industrial estate, a university, a research institutes, and the like.

A control computer configured to control anti-disaster facilities (the water stop gate A-12, pumps A-14 and A-16, water stop gates A-22 and A-31, a disaster management radio system B-1, and the like) in the economy concentration region A and the residence region B is provided in a building in the economy concentration area A-1. Note that it does not matter where the control computer is placed. The control computer may be provided for each of a building area A-2 with scattered buildings, a subway area A-3, and the residence region B.

Opening/closing of the water stop gate A-12 is controlled by a control computer. Note that although FIG. 1 illustrates only one water stop gate A-12, the water stop gate A-12 may include a plurality of water stop gates A-12. The water stop gate A-12 may be a water stop plate to be manually opened/closed. In this case, if there is a flood possibility, the control computer may instruct a user or a resident to use the water stop plate by some notification means (a means using the sense of seeing, hearing, touching, or smelling).

In addition, a water gauge A-13 configured to detect the water level of a river flowing near the economy concentration region A and a flowmeter A-15 configured to detect the flow rate in a sewage pipe in the economy concentration area A-1 are provided. The outputs (the water level and the flow rate) of the water gauge A-13 and the flowmeter A-15 are collected by a control computer.

The pump A-14 configured to drain water from the economy concentration area A-1 to a river or a sewage pipe in a case in which the economy concentration area A-1 surrounded by the wall A-11 and the water stop gate A-12 is flooded is provided near the river in the economy concentration area A-1. The pump A-14 operates using an uninterrupted power supply (private power generator) A-16 as a power supply and is controlled by a control computer.

A weather radar A-17 is provided in the economy concentration area A-1. Information obtained by the weather radar A-17 is collected by a control computer.

At the gateway of a building A-21 in the building area A-2 with scattered buildings, a water stop gate A-22 configured to protect the building A-21 from a flood is provided. Opening/closing of the water stop gate A-22 is controlled by a control computer. The water stop gate A-22 also includes a mechanism (not shown) that allows the gate to be manually opened/closed in case of a power failure. Sandbags, water absorbing sandbags, and the like are also provided as an insurance against a failure such as a breakdown of the water stop gate A-22.

Note that the water stop gate A-22 may be a water stop plate to be manually opened/closed, like the water stop gate A-12. In this case, as described above, if there is a flood possibility, the control computer may instruct a user or a resident to use the water stop plate by some notification means (a means using the sense of seeing, hearing, touching, or smelling).

In the subway area A-3, a water stop gate A-31 configured to protect a subway from a flood is provided at the gateway of the subway. Opening/closing of the water stop gate A-31 is controlled by a control computer.

Note that the water stop gate A-31 may be a water stop plate to be manually opened/closed, like the water stop gate A-12. In this case, as described above, if there is a flood possibility, the control computer may instruct a user or a resident to use the water stop plate by some notification means (a means using the sense of seeing, hearing, touching, or smelling).

A disaster management radio system B-11 or the like is provided in the residence region B. The disaster management radio system B-11 is controlled by a control computer to make disaster broadcasting to do escape guidance for residents.

FIG. 2 is a block diagram showing the relationship between control computers 13-1 to 13-$n$ and a cloud computer 12.

As shown in FIG. 2, the control computers 13-1 to 13-$n$ and the cloud computer 12 are connected via a network 11 such as the Internet. Pieces of water-associated information such as rainfall information, water level information of a river, and flow rate information of a sewage pipe are sent from the control computers 13-1 to 13-$n$ to the cloud computer 12.

On the other hand, upon determining that there is a flood possibility, the cloud computer 12 notifies the control computers 13-1 to 13-$n$ responsible for a region that may be flooded of the flood possibility.

Upon receiving the notification representing the flood possibility from the cloud computer 12, the control computers 13-1 to 13-$n$ control the control target of the control computers 13-1 to 13-$n$.

As described above, rainfall information and water-associated information in a wide area which are sent from the control computers 13-1 to 13-$n$ arranged at various positions are accumulated in the cloud computer 12 as big data.

Figure 3:
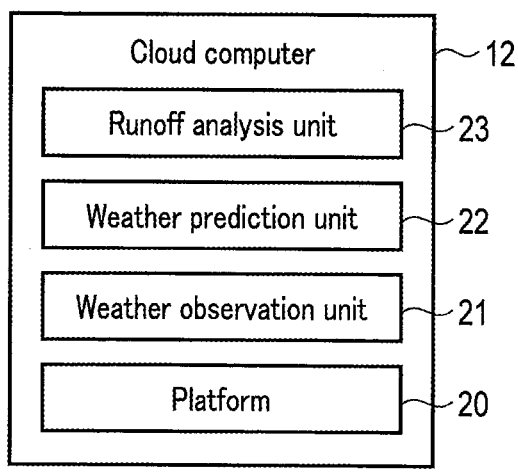
FIG. 3 is a block diagram for explaining the functions of the cloud computer 12.

FIG. 3 is a block diagram for explaining the functions of the cloud computer 12.

As shown in FIG. 3, the cloud computer 12 includes a platform 20, a weather observation unit 21, a weather prediction unit 22, and a runoff analysis unit 23.

The platform 20 has an external interface with a function of receiving data from outside, a function of making the functions cooperate, a database function, and a function of displaying/transmitting a result to outside.

The weather observation unit 21 has a function of receiving coarse metrological information on a global basis from satellites, a function of receiving rainfall information in a wide area from the weather radar at a high accuracy and a high resolution, and a function of receiving rainfall information and the like at a specific point from ground instruments (a rain gauge, a water gauge, and a flowmeter).

The weather prediction unit 22 has a short-time rainfall prediction function (up to 1 hr) of predicting an imminent rainfall by analyzing data of the weather radar, and a long-time prediction function (1 hr to) of predicting a future weather state by inputting weather observation information to a weather model representing a weather phenomenon by an equation and performing large-scale calculations.

The runoff analysis unit 23 has a function of predicting a region (point) of external flooding (a failure of a dam or a river embankment) or internal flooding (a function in an urban district) by analyzing terrain roughness or a permeation amount based on ground rainfall.

Figure 4:
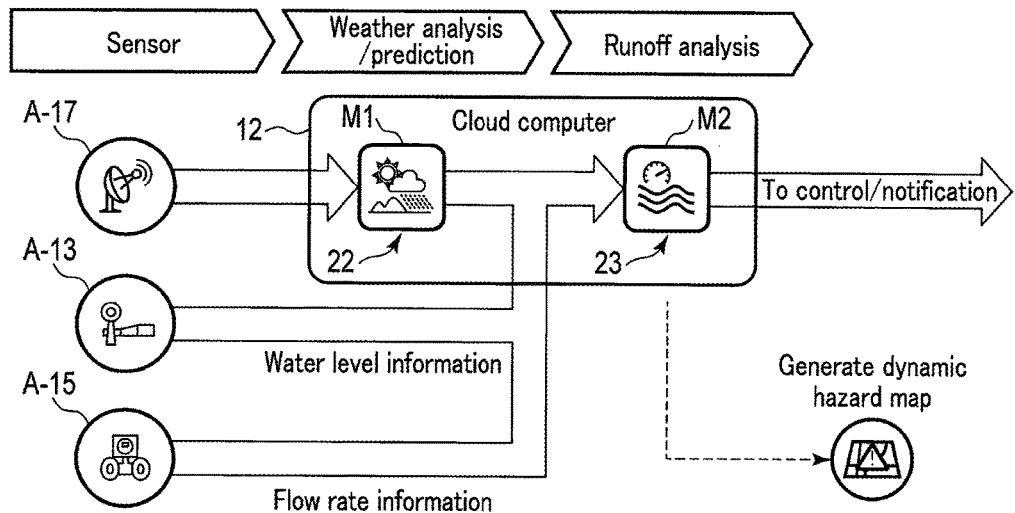
FIG. 4 is a view showing the procedure of processing of predicting a flood region based on rainfall information from a weather radar A-17, water level information from a water gauge A-13, and sewage flow rate information from a flowmeter A-15 and performing control.

FIG. 4 is a view showing the procedure of processing of predicting a flood region based on rainfall information from the weather radar A-17, water level information from the water gauge A-13, and sewage flow rate information from the flowmeter A-15 and performing control.

A description will be made here using the disaster prevention system shown in FIG. 1 as an example. A rainfall in a wide area measured by the weather radar A-17 is input to the weather prediction unit 22 of the cloud computer 12 via the network 11. The weather prediction unit 22 has a weather model M1, and predicts a future rainfall for each region (point) for the input rainfall in the wide area. Note that the weather model M1 itself, which predicts the future rainfall, is a known technique, and a detailed description thereof will be omitted here.

On the other hand, the water level information of a river flowing near the economy concentration region A, which is measured by the water gauge A-13, and flow rate information of water flowing through a sewage pipe in the economy concentration area A-1, which is measured by the flowmeter A-15, are input to the runoff analysis unit 23 of the cloud computer 12 via the network 11.

The runoff analysis unit 23 has a runoff analysis model M2, and predicts a flood region (point) based on the input future predicted rainfall, water level information, and flow rate information. Note that the runoff analysis model M2 itself, which predicts the flood region based on the predicted rainfall is a known technique, and a detailed description thereof will be omitted here. FIG. 4 shows a case in which the water level information and the flow rate information are input to the runoff analysis model M2. However, these pieces of information need not always be input. In addition, to predict the flood region, not only the predicted rainfall, water level information, and flow rate information in a predicted region but also a predicted rainfall, water level information, and flow rate information in another region may be used. That is, the pieces of information necessary for protecting the predicted region from a flood are not limited to the information in the predicted region. For example, if a river flows in the predicted flood region, a predicted rainfall and the like in the upstream region of the river may be used.

If the runoff analysis unit 23 predicts the flood region, a control computer that manages the predicted flood region is notified of the predicted flood region. Note that not only the control computer that manages the predicted flood region but also all control computers or control computers that manage adjacent regions may be notified.

Upon receiving the notification from the cloud computer 12, the control computer performs predetermined processing for a control target managed by the control computer.

The pieces of information (the rainfall, the predicted rainfall, the water level information, and the flow rate information) handled by the cloud computer 12 are associated with point information (position information). The management range of the control computer is also associated with the point information. The cloud computer 12 has a database that stores the various kinds of information associated with the point information, and performs processing using these pieces of information stored in the database.

The processing of the control computer in a case in which the cloud computer 12 notifies the control computer that manages the predicted flood region of the predicted flood region will be described below.

Note that in this embodiment, a case in which the cloud computer 12 controls the control target via the control computer has been described. However, the cloud computer 12 may directly control the control target.

First Embodiment: Control in Economy Concentration Area A-1

Figure 5:
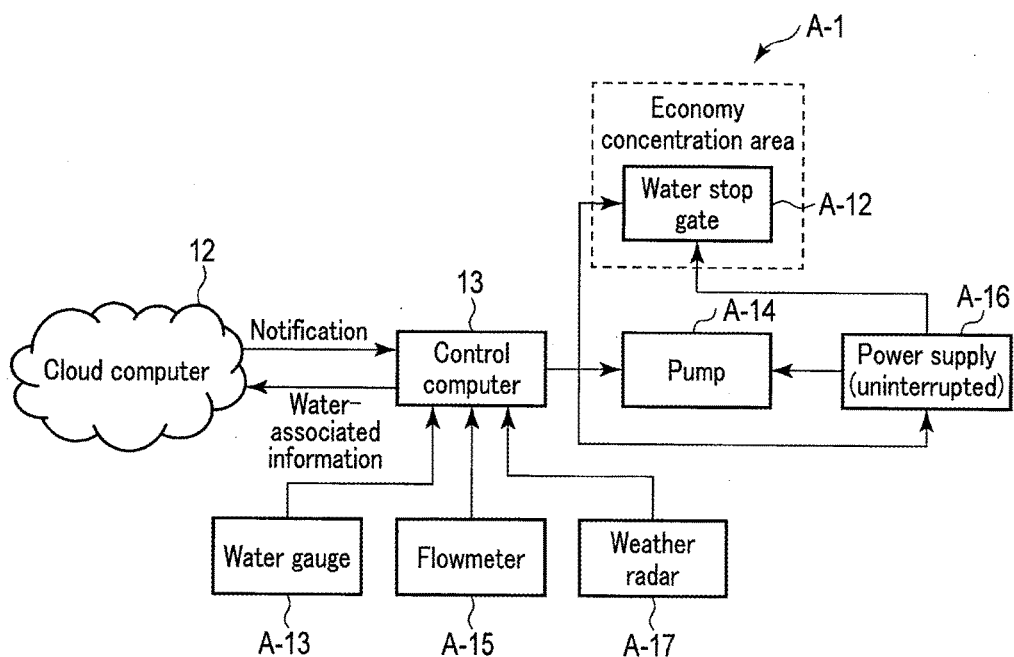
FIG. 5 is a block diagram showing a disaster prevention system according to the first embodiment, which is configured to control a water stop gate A-12 in an economy concentration area A-1.

FIG. 5 is a block diagram showing a disaster prevention system according to the first embodiment, which is configured to control a water stop gate A-12 in an economy concentration area A-1.

As shown in FIG. 5, a control computer 13 is connected to a water gauge A-13, a flowmeter A-15, and a weather radar A-17. Water level information, flow rate information, and rainfall information measured by these devices are sent to a cloud computer 12 via a network.

When notified by the cloud computer 12 that the region managed by the control computer 13 may be flooded, the control computer 13 controls to close the water stop gate A 12 in the economy concentration area A 1. The economy concentration area A 1 can thus quickly be protected from a flood disaster such as an overflow.

When notified by the cloud computer 12 that the region managed by the control computer 13 may be flooded, the control computer 13 operates a pump A 14 to drain water that has entered the economy concentration area A 1 to a river or a sewage pipe.

An uninterrupted power supply (private power generator) A-16 is connected to the water stop gate A-12 and the pump A-14 in the economy concentration area A-1, and power is always supplied to the water stop gate A-12 and the pump A-14.

Note that in a normal state, power from a normal power supply may be supplied to the water stop gate A-12 and the pump A-14 in the economy concentration area A-1. If a flood possibility is notified, the uninterrupted power supply (private power generator) A-16 may be driven to supply power.

Hence, according to the first embodiment, if a flood possibility is notified, the water stop gate A-12 in the economy concentration area A-1 can quickly be closed. It is therefore possible to quickly protect the economy concentration area A-1 from a flood disaster such as an overflow. Even if a flood occurs in the economy concentration area A-1, the water can quickly be drained by operating the pump A-14.

Second Embodiment: Control in Building Area A-2 and Subway Area A-3

FIG. 6 is a block diagram showing a disaster prevention system according to the second embodiment, which is configured to control in a building area A-2 and a subway area A-3.

When notified by a cloud computer 12 that the region managed by a control computer 13 may be flooded, the control computer 13 controls to close a water stop gate A-22 provided at the gateway of a building A-21 in the building area A-2. The building in the building area A-2 can thus quickly be protected from a flood disaster.

Note that an uninterrupted power supply (private power generator) A-23 provided in the building A-21 is connected to the water stop gate A-22, and power is always supplied to the water stop gate A-22.

In addition, when notified by the cloud computer 13 that the region managed by the control computer 13 may be flooded, the control computer 13 controls to close a water stop gate A-31 in the subway area A-3. The subway in the subway area A3 can thus quickly be protected from a flood disaster.

Note that an uninterrupted power supply (private power generator) A-32 provided in the subway is connected to the water stop gate A-31, and power is always supplied to the water stop gate A-31.

In a normal state, power from a normal power supply may be supplied to the water stop gates A-22 and A-31. If a flood possibility is notified, the uninterrupted power supplies (private power generators) A-23 and A-32 may be driven to supply power.

In the second embodiment, a description has been made using a building and a subway as an example. However, the embodiment can also be applied to another important facility, for example, a school, a hospital, a military installation, or a government building.

Hence, according to the second embodiment, if a flood possibility is notified, control is performed to close the water stop gates A-22 and A-31, thereby protecting important facilities such as the building in the building area A-2 and the subway facility in the subway area A-3 from a flood disaster such as an overflow.

Figure 7:
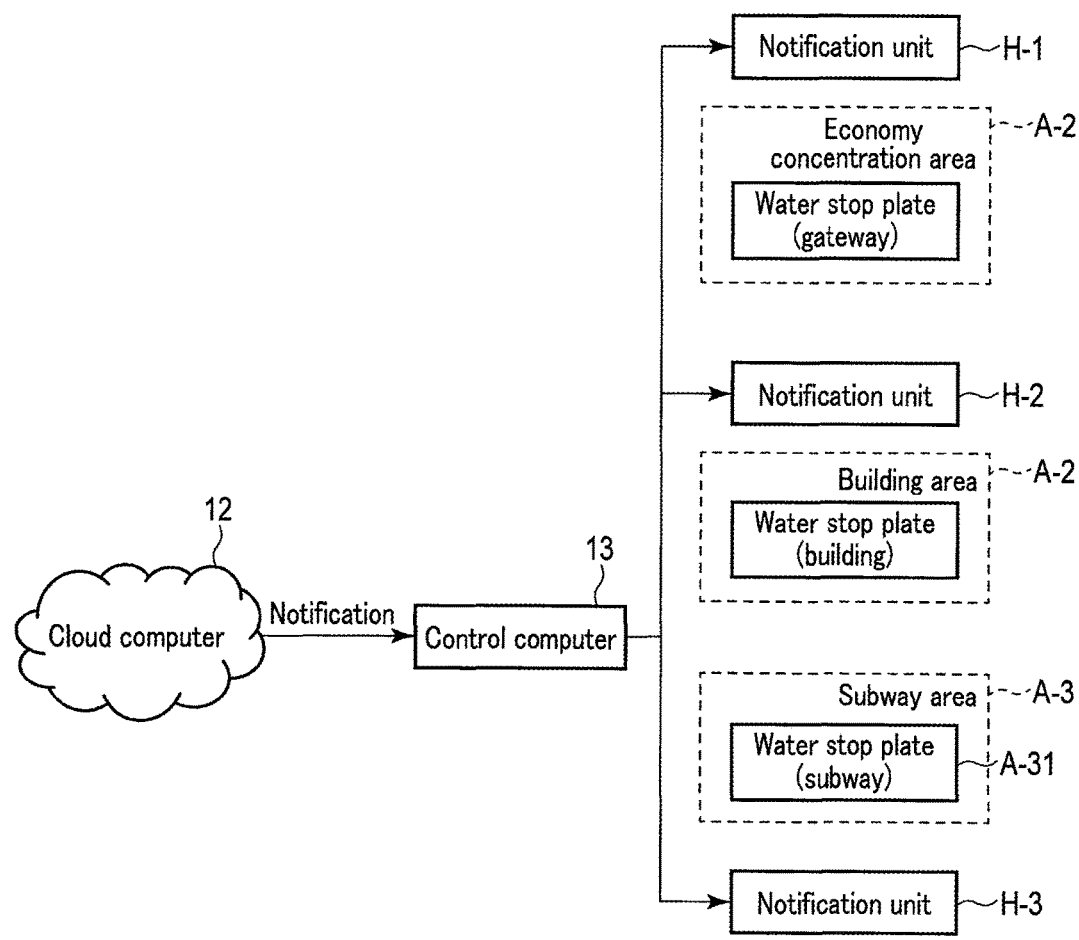
FIG. 7 is a block diagram showing a disaster prevention system in a case in which a water stop plate is used in the first and second embodiments.

Note that in the first and second embodiments, in a case in which water stop plates to be manually opened/closed are used in place of the water stop gates A-12, A-22, and A-31, when notified that the region managed by the control computer 13 may be flooded, the control computer 13 instructs notification units H-1 to H-3 in the regions managed by the control computer 13 to use the water stop plates, as shown in FIG. 7. Upon receiving the instruction from the control computer 13, the notification units H-1 to H-3 notify the use of the water stop plates.

The notification units H-1 to H-3 are, for example, a computer, a portable telephone, a radio facility, or a broadcasting station. As for the notification method of the notification units H-1 to H-3, for example, the use of the water stop plate may be displayed on the screen of a computer or a portable telephone, the use of the water stop plate may be broadcast by an announcement on the premise, a user's or resident's portable telephone may be vibrated, a portable telephone may be caused to generate a beep to notify the use of the water stop plate, or a foreign odor may be generated.

Accordingly, the user or resident can quickly know the use of the water stop plate even if the water stop plate is manually opened/closed, and the region can be protected from a flood.

Third Embodiment: Control in Residence Region B

The third embodiment is directed to a disaster prevention system concerning an escape guiding method for residents in the residence region B, which can conduct a rapid evacuation of residents if a flood possibility is notified.

Figure 8:
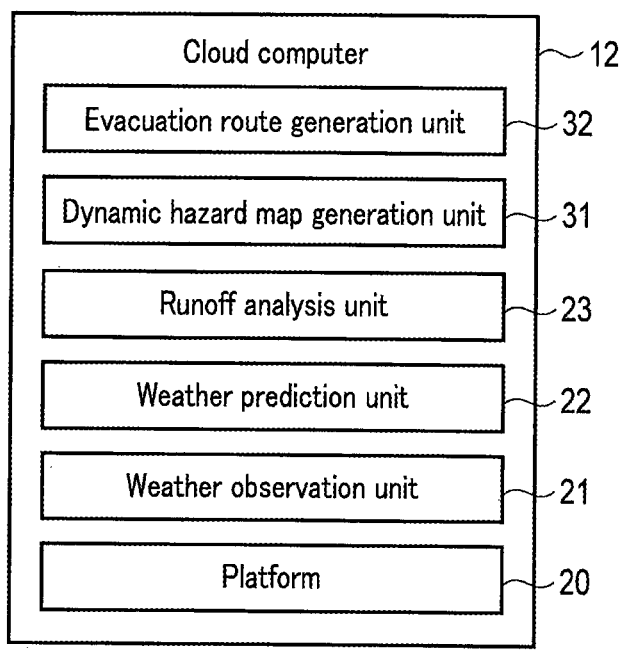
FIG. 8 is a block diagram showing the arrangement of a cloud computer 12 according to the third embodiment.

FIG. 8 is a block diagram showing the arrangement of a cloud computer 12 according to the third embodiment. As shown in FIG. 8, the cloud computer 12 includes a dynamic hazard map generation unit 31 and an evacuation route generation unit 32 in addition to the arrangement of the cloud computer 12 shown in FIG. 3.

The dynamic hazard map generation unit 31 generates a dynamic hazard map that changes moment by moment depending on weather conditions based on geographical information held by a runoff analysis unit 23 or the degree of a flood possibility. Note that hazard map generation itself is a known technique, and a detailed description thereof will be omitted here.

The evacuation route generation unit 32 creates an evacuation route according to an area on the generated dynamic hazard map, and generates an image in which the created evacuation route is displayed on the hazard map.

Figure 10:
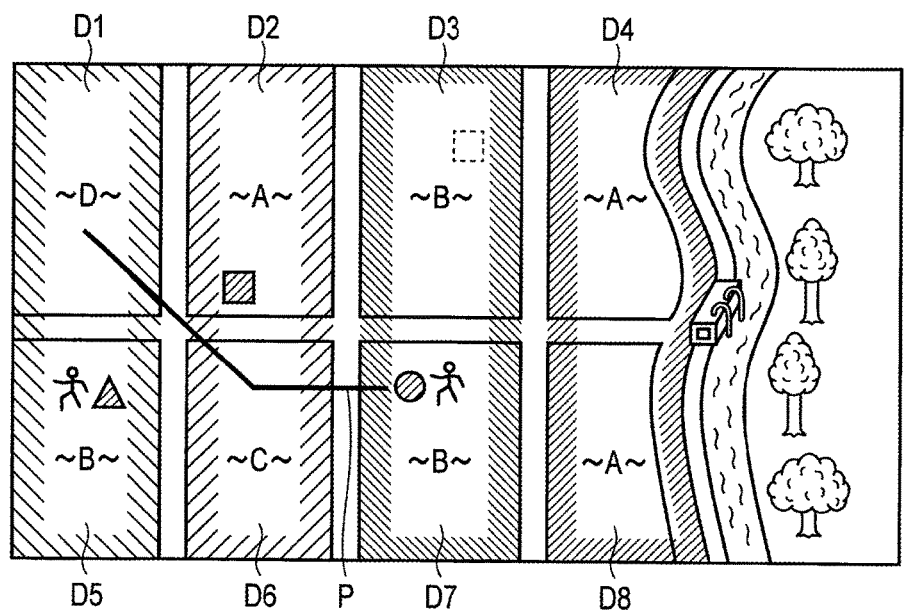
FIG. 10 is a view showing an example of a hazard map with an evacuation route.

FIG. 10 is a view showing an example of a hazard map with an evacuation route.

As shown in FIG. 10, a flood state in each of areas D1 to D8 are shown. In FIG. 10, an evacuation route P that guides residents in the area D7 to the area D1 with the shallowest flood depth via the area D6 with a relatively shallow flood depth is displayed.

As described above, since the cloud computer manages position information, a dynamic hazard map can be provided for each area. As a result, it is possible to conduct a safe and efficient evacuation of residents. Note that the unit to generate a hazard map is not limited to an area, and the hazard map may be generated for each region or a smaller unit. A case in which the evacuation route P is displayed on the hazard map has been described here. However, only the evacuation route P or only the hazard map may be displayed. The evacuation route P and the hazard map include an evacuation route P and hazard map up to the current point of time and a predicted evacuation route and hazard map.

Figure 9:
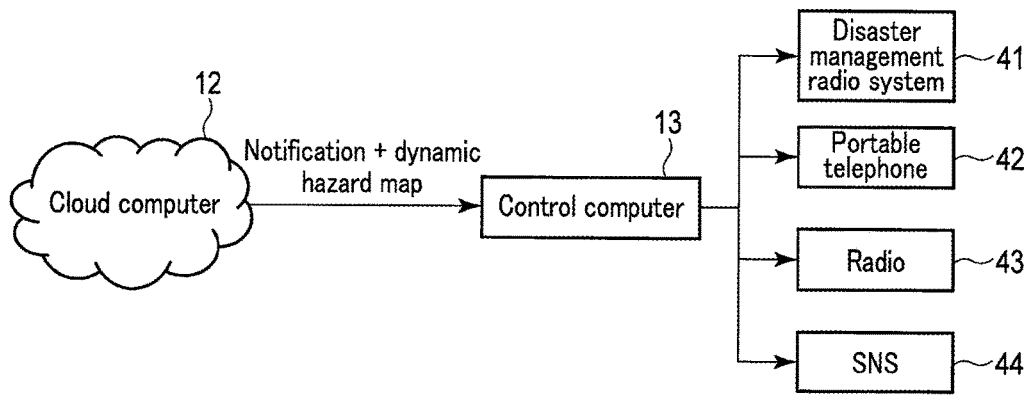
FIG. 9 is a block diagram showing a disaster prevention system according to the third embodiment, which is configured to perform control in a residence region B.

FIG. 9 is a block diagram showing a disaster prevention system according to the third embodiment, which is configured to perform control in the residence region B.

When notified by the cloud computer 12 that the region managed by a control computer 13 may be flooded, the control computer 13 performs escape guidance via a disaster management radio system 41 or the like in the residence region B.

The cloud computer 12 sends a dynamic hazard map with an evacuation route generated by the evacuation route generation unit 32 to the control computer together with a flood possibility notification. As shown in FIG. 9, the control computer 13 performs escape guidance by controlling the disaster management radio system 41, a portable telephone 42, a radio 43, and an SNS (Social Network Service) 44.

At this time, when using the portable telephone 42 or the SNS 44, the dynamic hazard map with the evacuation route sent from the cloud computer 12 is transmitted. The user can thus confirm the evacuation route according to the state that changes moment by moment and the safety for the people in the residence region B can effectively be ensured.

Note that a case in which the control computer 13 controls the disaster management radio system 41 and the like has been described above. However, direct control may be done on the side of the cloud computer 12.

A notification such as hazard map transmission described in the third embodiment can be applied not only to the residence region B but also to the economy concentration region A, as a matter of course.

Hence, according to the third embodiment, if a flood possibility is notified, the escape guidance for the people in the residence region B can quickly be done. As a result, the lives of the people in the residence region B can be protected from a flood disaster.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disaster prevention system comprising:
   a weather prediction unit configured to calculate a predicted rainfall in a region based on rainfall information necessary for protecting the region from a flood;
   an analysis unit configured to determine, based on the predicted rainfall calculated by the weather prediction unit, whether a flood can occur in the region; and
   a control unit configured to control to close a water stop gate provided in the region to protect the region from the flood if the analysis unit determines that the flood can occur in the region,
   wherein if the analysis unit determines that the flood can occur in the region, the control unit controls a water stop plate provided at a gateway of a subway in the region.

2. The disaster prevention system according to claim 1, wherein the rainfall information is observed by a weather radar.

3. The disaster prevention system according to claim 1, wherein the region is a region partially surrounded by one of a wall and the water stop gate configured to protect the region from the flood.

4. The disaster prevention system according to claim 1, wherein the analysis unit determines whether the flood can occur in the region, further based on water level information of a river in the region.

5. The disaster prevention system according to claim 1, wherein the analysis unit determines whether the flood can occur in the region, further based on flow rate information of sewage.

6. The disaster prevention system according to claim 1, wherein if the analysis unit determines that the flood can occur in the region, the control unit further operates a chain pump provided in the region.

7. The disaster prevention system according to claim 6, wherein the drain pump is connected to an uninterrupted power supply placed in the region.

8. A disaster prevention system comprising:
   a weather prediction unit configured to calculate a predicted rainfall in a region based on rainfall information necessary for protecting the region from a flood;
   an analysis unit configured to determine, based on the predicted rainfall calculated by the weather prediction unit, whether a flood can occur in the region; and
   a control unit configured to control to close a water stop gate provided in the region to protect the region from the flood if the analysis unit determines that the flood can occur in the region,
   wherein if the analysis unit determines that the flood can occur in the region, the control unit controls a water stop plate provided at an entrance of a building in the region.

9. The disaster prevention system according to claim 8, wherein the rainfall information is observed by a weather radar.

10. The disaster prevention system according to claim 8, wherein the region is a region partially surrounded by one of a wall and the water stop gate configured to protect the region from the flood.

11. The disaster prevention system according to claim 8, wherein the analysis unit determines whether the flood can occur in the region, further based on water level information of a river in the region.

12. The disaster prevention system according to claim 8, wherein the analysis unit determines whether the flood can occur in the region, further based on flow rate information of sewage.

13. The disaster prevention system according to claim 8, wherein if the analysis unit determines that the flood can occur in the region, the control unit further operates a drain pump provided in the region.

14. The disaster prevention system according to claim 13, wherein the drain pump is connected to an uninterrupted power supply placed in the region.

15. A disaster prevention system comprising:
   a weather prediction unit configured to calculate a predicted rainfall in a region based on rainfall information necessary for protecting the region from a flood;
   an analysis unit configured to determine, based on the predicted rainfall calculated by the weather prediction unit, whether a flood can occur in the region; and
   an instruction unit configured to output an instruction to use a water stop plate provided in the region if the analysis unit determines that the flood can occur in the region,
   wherein the region is one of a region partially surrounded by one of a wall and the water stop gate provided at a gateway, a gateway of a subway, and an entrance of a building.

16. The disaster prevention system according to claim 15, wherein the analysis unit determines whether the flood can occur in the region, further based on water level information of a river in the region.

17. The disaster prevention system according to claim 15, wherein the analysis unit determines whether the flood can occur in the region, further based on flow rate information of sewage.

18. The disaster prevention system according to claim 15, further comprising a notification unit configured to notify use of the water stop plate based on the instruction by the instruction unit.

19. The disaster prevention system according to claim 15, wherein the notification unit notifies using a display device.

20. The disaster prevention system according to claim 15, wherein the rainfall information is observed by a weather radar.

* * * * *